(12) United States Patent
Willis et al.

(10) Patent No.: US 11,831,832 B2
(45) Date of Patent: Nov. 28, 2023

(54) SCANNABLE THUMBNAILS FOR ASSOCIATION WITH DATA OBJECTS

(71) Applicant: Relevant, Inc., Orem, UT (US)

(72) Inventors: Mark W. Willis, Orem, UT (US); Zachary M. Willis, Orem, UT (US); Tyson S. Willis, Orem, UT (US)

(73) Assignee: Relevant, Inc., Orem, UT (US)

(*) Notice: Subject to any disclaimer, the term of this patent is extended or adjusted under 35 U.S.C. 154(b) by 0 days.

(21) Appl. No.: 17/495,384

(22) Filed: Oct. 6, 2021

(65) Prior Publication Data
US 2023/0104396 A1    Apr. 6, 2023

(51) Int. Cl.
*H04N 1/32* (2006.01)
*G06K 7/14* (2006.01)
*G06K 19/06* (2006.01)
*G06V 20/30* (2022.01)
*G06V 40/16* (2022.01)

(52) U.S. Cl.
CPC ....... *H04N 1/32149* (2013.01); *G06K 7/1417* (2013.01); *G06K 19/06037* (2013.01); *G06V 20/30* (2022.01); *G06V 40/172* (2022.01)

(58) Field of Classification Search
CPC .......... G06K 7/1417; G06K 19/06037; G06V 20/30; G06V 40/172
See application file for complete search history.

(56) References Cited

U.S. PATENT DOCUMENTS

| | | | |
|---|---|---|---|
| 2012/0249853 A1* | 10/2012 | Krolczyk | H04N 1/215 348/E5.022 |
| 2015/0116733 A1* | 4/2015 | Takada | H04N 1/00347 358/3.28 |
| 2016/0042252 A1* | 2/2016 | Sawhney | G06F 16/5838 382/190 |
| 2018/0129844 A1* | 5/2018 | Rothschild | G06K 7/10722 |
| 2019/0122354 A1* | 4/2019 | Hewes | G06V 10/993 |
| 2020/0125575 A1* | 4/2020 | Ghoshal | G06F 40/247 |
| 2020/0150832 A1* | 5/2020 | Winn | A61K 39/39566 |

* cited by examiner

*Primary Examiner* — Laura A Gudorf
(74) *Attorney, Agent, or Firm* — TechLaw Ventures, PLLC; Terrence J. Edwards

(57) ABSTRACT

Scannable thumbnails for identifying data objects stored on a database. A method includes identifying a data collection comprising one or more data objects stored on a database and receiving a thumbnail selection to represent the data collection, wherein the thumbnail selection comprises one or more of an image from the data collection, a graphic, or text. The method includes generating a scannable code associated with the data collection merging the scannable code with the thumbnail selection to generate a scannable thumbnail.

20 Claims, 15 Drawing Sheets

SCANNABLE THUMBNAILS FOR ASSOCIATION WITH DATA OBJECTS

TECHNICAL FIELD

The present disclosure relates to data storage and manipulation and particularly relates to generating unique codes associated with data objects.

BACKGROUND

It is desirable to create tangible and printed keepsakes of images, documents, artwork, and written works for display and safe keeping. However, tangible and printed keepsakes such as photo books, art prints, wall coverings, and printed documents cannot support all types of media. Additionally, printed keepsakes introduce space constraints and resource constraints that are not associated with digital media. In some cases, it is desirable to created tangible keepsakes of images or documents associated with an event, and further to have access to videos and other media associated with the same event. However, it can be challenging to organize printed keepsakes and digital media in a congruous manner such that digital media and printed keepsakes can be easily and efficiently associated with one another.

In light of the foregoing, disclosed herein are systems, methods, and devices for storing, organizing, and providing digital media in association with printed keepsakes.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
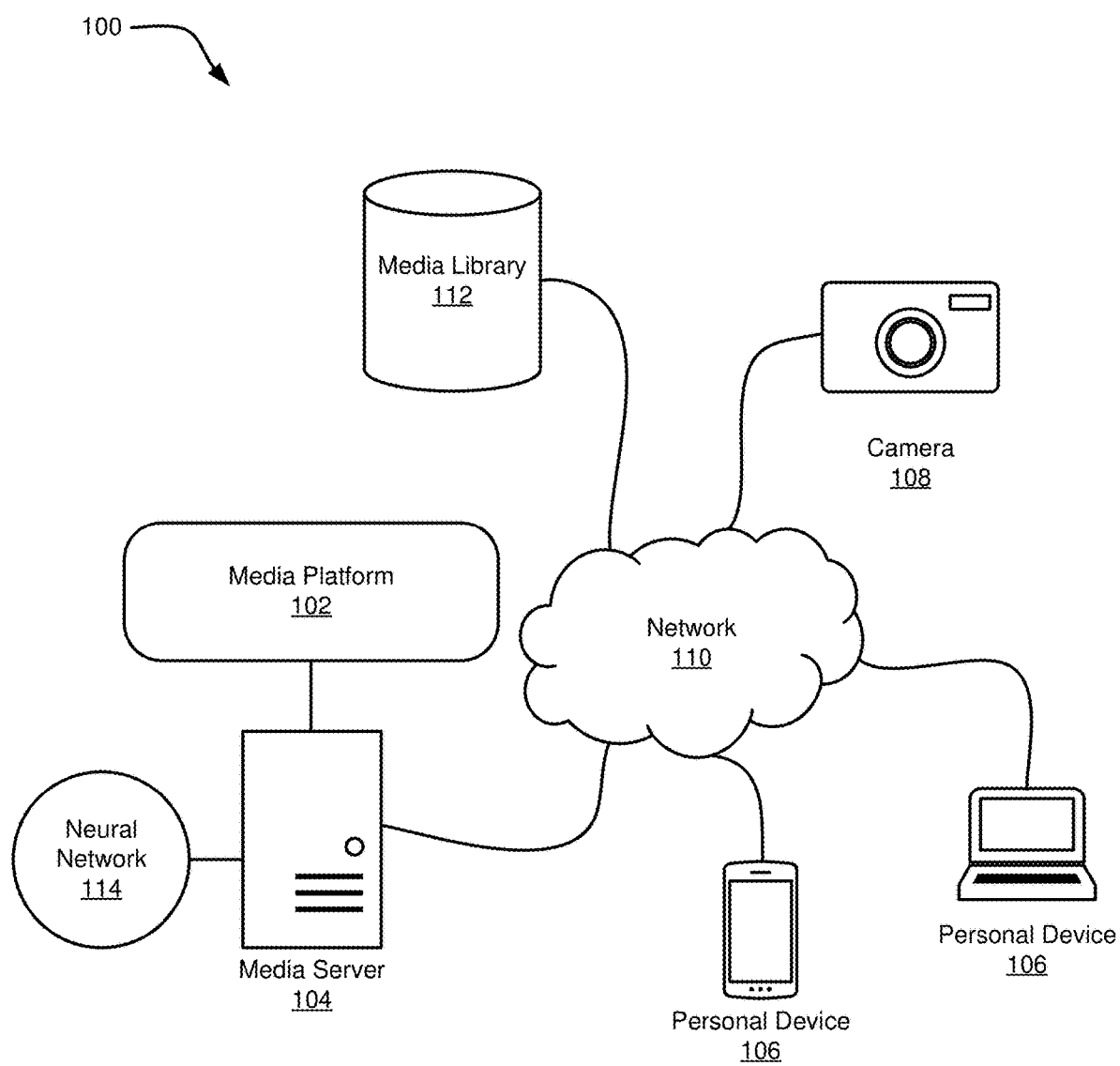
FIG. 1 is a schematic diagram of a digital media and printed keepsake system.

Disclosed herein are systems, methods, and devices for generating a scannable thumbnail to be associated with a data collection. The systems described herein enable a user to generate a data collection comprising one or more data objects such as videos, images, documents, written works, numerical works, art works, and so forth. The data collection is securely stored and organized on a cloud-based database and may be published on a webpage with public access or password-protected access. The systems described herein generate a scannable thumbnail and associate the scannable thumbnail with the data collection such that a user can access the data collection by scanning the scannable thumbnail. The scannable thumbnail may include a thumbnail image that represents the data collection and may further include a scannable code (such as a QR code) that is merged with the thumbnail image or overlaid on the thumbnail image. The scannable thumbnail may be printed on a keepsake to provide access to additional digital media in association with the printed keepsake.

Described herein is a means to provide keepsake creators a way to store, organize, and provide videos and other digital media within tangible, printed keepsakes. The systems described herein include an application for allowing users to upload digital media, edit the digital media, and organize and manage the digital media. A user can select a thumbnail image from the digital media or create a thumbnail to represent the digital media. The systems described herein generate a scannable code to be associated with the digital media, such as an optically readable code like a QR code. The scannable code is combined with the selected thumbnail to generate a scannable thumbnail. The scannable thumbnail can be exported as an image and include in printed keepsakes. When the scannable thumbnail (in a tangible, printed format) is scanned by an image sensor associated with a computing device, the scannable code provides instructions to the computing device to access the digital media. The digital media may be published on a webpage, accessible by way of an administrator login for cloud-based database access, accessible by way of a computer-executed application, and so forth. The tangible printed keepsake including the scannable thumbnail thereby enables the user to congruously present printed and digital media.

Before the methods, systems, and devices are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A detailed description of systems, methods, and devices consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Referring now to the figures, FIG. 1 is a schematic diagram of a system 100 for storing and accessing digital media associated with a unique code. The system 100 includes a media platform 102 operated by a media server 104. The system 100 includes one or more personal devices 106 such as mobile phones, laptops, personal computers, tablets, and so forth. The system 100 includes one or more cameras 108 which may include standalone cameras, cameras attached to a personal computing device such as a tablet or mobile phone, security cameras, standalone image sensors, and so forth. The system 100 further includes a media library 112 for storing digital media including images, videos, and so forth. Each of the media server 104, the personal devices 106, and the cameras 108 is in communication with a network 110 such as the Internet.

The media platform 102 includes a user interface and logic for managing image and video datasets and further for generating unique codes associated with digital media. The media platform 102 is operated by the media server 104, which is in communication with other entities and databases by way of Application Program Interfaces (APIs), Secure File Transfer Protocols (SFTP), or other connections by way of the network 110.

The personal devices 106 include any personal computing device that can communicate with the media server 104 by way of the network 110. The personal device 106 may include a smart phone, tablet, laptop, personal computer, and so forth. The personal devices 106 communicate with the media server 104 by way of a local area network (LAN), wide area network (WAN), or another network connection. The personal devices 106 may comprise processing resources for executing instructions stored in non-transitory computer readable storage media. These instructions may be incorporated in an application stored locally to the personal device 106, an application accessible on a web browser, and so forth. The application enables a user to access the user interface for the media platform 102 to upload digital media, access digital media, edit digital media, organize digital media, generate unique codes associated with digital media, and so forth.

In an embodiment, a user accesses an account associated with the media platform 102 by way of the personal device 106. The user may be assigned a security role and restricted access to certain datasets stored on the media library 112. Security roles restrict what information and/or functionality the user can access.

The camera 108 includes an image sensor with a pixel array configured for sensing reflected electromagnetic radiation for generating an image of a scene. The camera 108 may include capabilities for capturing image frames in sequence for generating a video stream. The camera 108 may be integrated on the personal device 106, for example, the camera 108 may include one or more image sensors on a mobile phone that may communicate directly with an application stored on the mobile phone for capturing digital media and providing the digital media to the media server 104. The camera 108 may include a standalone camera or image sensor such as a point-and-shoot camera, a mirrorless camera, a DSLR camera, a webcam, and so forth.

The media library 112 is a repository of data, including digital media to be stored and accessed, unique codes associated with the digital media, and metadata associated with the digital media. The media server 104 may access the media library 112 by way of an Application Program Interface (API) over the network 110 connection. The API allows the media server 104 to receive automatic updates from the media library 112 as needed. In an embodiment, the imaging library 112 is integrated on the image server 104 and is not independent of the storage and processing resources dedicated to the media server 104.

The neural network 114 comprises storage and processing resources for executing a machine learning or artificial intelligence algorithm. The neural network 114 may include a deep learning convolutional neural network (CNN). The convolutional neural network is based on the shared weight architecture of convolution kernel or filters that slide along input features and provide translation equivalent responses known as feature maps. The neural network 114 may include one or more independent neural networks trained to implement different machine learning processes. The neural network 114 may be trained to classify digital media that has been uploaded to the media library 112. The classifications output by the neural network 114 may be used to aid a user in organizing digital media, classifying digital media, and selecting digital media to be included in keepsakes.

In an example implementation, a user uploads a video to the media library 112. The neural network 114 analyzes one or more image frames in the video and classifies the video. The neural network 114 may classify the video as including certain people or objects. The neural network 114 is trained to execute facial recognition for known persons and classify the video as likely including certain people known to the user. The neural network 114 is trained to classify the quality of the video based on one or more of contrast, ratio of light to dark portions of the image, exposure, white balance, ratio of foreground to background, and so forth. The media server 104 may prioritize higher quality videos based on the neural network 114 classifications and may suggest the higher quality videos to the user to be included in keepsakes. The neural network 114 and/or the media server 104 are trained to group digital media together based on one or more of: the persons in the media based on facial recognition, the locations or objects in the media based on image analysis output by the neural network 114, the location of the media based on GPS tagging, timestamp metadata indicating when the media was captured, camera metadata indicating what device captured the media and under what circumstances, and so forth. The media server 104 may provide the grouped media to the user and suggest that the user select one or more from the grouped media to be included together in a keepsake to represent a certain event or time period.

Figure 2:
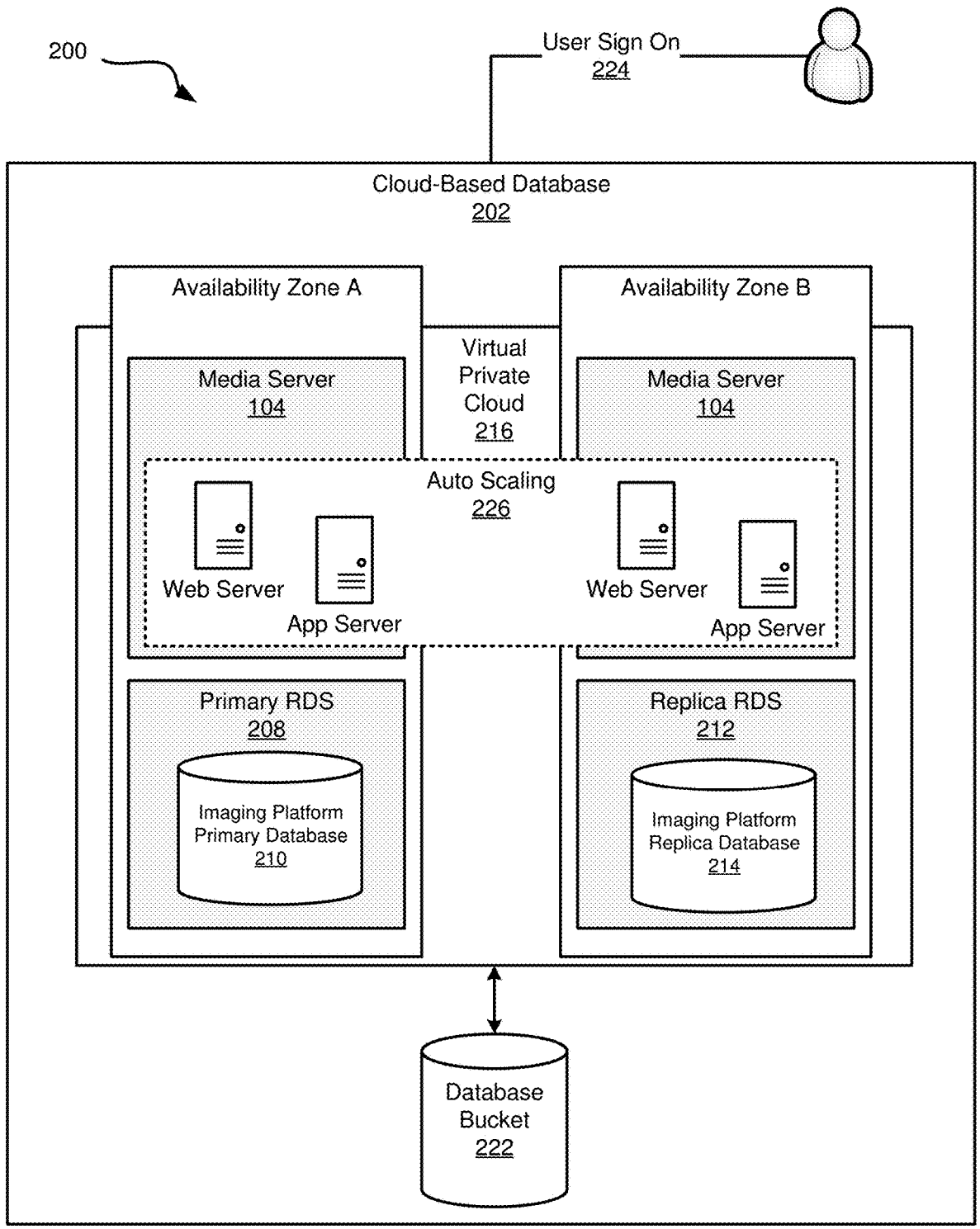
FIG. 2 is a schematic diagram of a computing platform comprising load balancing and fault tolerance for supporting the digital media and printed keepsake system.

FIG. 2 is a schematic block diagram of a system 200 for imaging analysis and testing management. The system 200 illustrated in FIG. 2 may be implemented in conjunction with the system 100 illustrated in FIG. 1. The system 200 includes a cloud-based database 202 supporting the media server 104. The cloud-based database 202 includes an Availability Zone A and an Availability Zone B. The Availability Zone A includes a first instance of the media server 104 and the Availability Zone B includes another instance of the media server 104. Each of the instances of the media server 104 includes a web server and an app server, and the cloud-based database 202 auto-scales the processing and storage resources between the web servers and app servers for the Availability Zone A and the Availability Zone B. The Availability Zone A includes a primary relational database service (RDS) 208 and the Availability Zone B includes a replica relational database service 212. The media platform primary database 210 is stored on the primary relational database service 208 and the media platform replica database 214 is stored on the replica relational database service 212. The virtual private cloud 216 of the cloud-based database 202 communicates with outside parties by way of Application Program Interfaces 218 and Secure File Transfer Protocol (SFTP) 220 messaging. The cloud-based database 202 includes a database bucket 222 for storing information associated with the media platform 102. Users interacting the media platform 102 can sign on 224 to the service by communicating with the cloud-based database 202.

The cloud-based database 202 includes processing and storage resources in communication with the network 120. The cloud-based database 202 includes a resource manager for managing the usage of processing and storage resources. The resource manager of the cloud-based database 202 performs auto scaling 226 load balancing to ensure adequate processing and storage resources are available on demand based on real-time usage.

The availability zones represent discrete datacenters with redundant power, networking, and connectivity for supporting the media server 104. The availability zones enable the ability to operate production applications and databases in a more highly available, fault tolerant, and scalable way than would be possible with a single datacenter. The Availability Zone A and Availability Zone B are interconnected with high-bandwidth, low-latency networking, over fully redundant, dedicated metro fiber providing high-throughput, low-latency networking between the availability zones. All traffic between the availability zones is encrypted. The network performance of the availability zones is sufficient to accomplish synchronous replication between the availability zones. Applications, modules, components, and processing methods can be partitioned between the availability zones of the cloud-based database 202. When applications are partitioned across the availability zones, the media server 104 operates with increased protection and isolation from outages that may be caused by a low in power, hardware issues, software issues, and so forth. The availability zones are physically separated by a meaningful geographic distance to ensure the hardware supporting the availability zones will not be impacted by the same outside forces, such as power outages, natural disasters, and so forth.

The virtual private cloud 216 is an on-demand configurable pool of shared resources allocated within the cloud-based database 202. The virtual private cloud 216 provides isolation between different users communicating with the cloud-based database 202, e.g., different facilities, user accounts, and clients in communication with the media platform 102. The isolation between one virtual private cloud 216 user and all other users of the same cloud is achieved through allocation of a private IP subnet and a virtual communication construction such as a VLAN or a set of encrypted communication channels per user. The virtual private cloud 216 provides isolation between users within the cloud-based database 202 and is accompanied with a VPN function allocated per-user within the virtual private cloud 216. This secures the remote access to the media platform 102 by way of authentication and encryption. The media platform 102 is then essential run on a "virtually private" cloud, even if the processing and storage resources are provided by a third-party cloud-based database service, such as Amazon Web Services®.

The auto-scaling 226 is performed by a resource manager of the cloud-based database 202. The resource manager distributes workload between the web servers and the app servers of the various availability zones of the cloud-based database 202. In some cases, one client of the media platform 102 may consume a large quantity of storage resources and processing resources at a certain time, and the resource manager will allocate different web servers and app servers across the availability zones to ensure the client receives an adequate quantity of storage and processing resources. The auto-scaling 226 is performed in real-time to meet the needs of the media platform 102.

The primary and secondary relational database services 208, 212 provide a means to access, replicate, query, and write to the media platform database instances 210, 214. The media platform primary database 210 may include a copy of data associated with the media platform 102, such as user login information, user preference data, pharmaceutical inventory data, past purchasing data, current pricing data, pharmaceutical catalogue data, and so forth. The media platform replica database 214 may include a replica copy of all or some of the data stored on the media platform primary database 210. The replicated databases provide fault-tolerance and protect the media platform 102 form becoming inoperative during a power outage, hardware outage, or natural disaster.

The database bucket 222 provides object storage through a web service interface. The database bucket 222 uses scalable storage infrastructure that can be employed to store any type of object. The database bucket 222 may store applications, software code, backup and recovery, disaster recovery, data archives, data lakes for analytics, and hybrid cloud storage to support the media platform 102.

Figure 3:
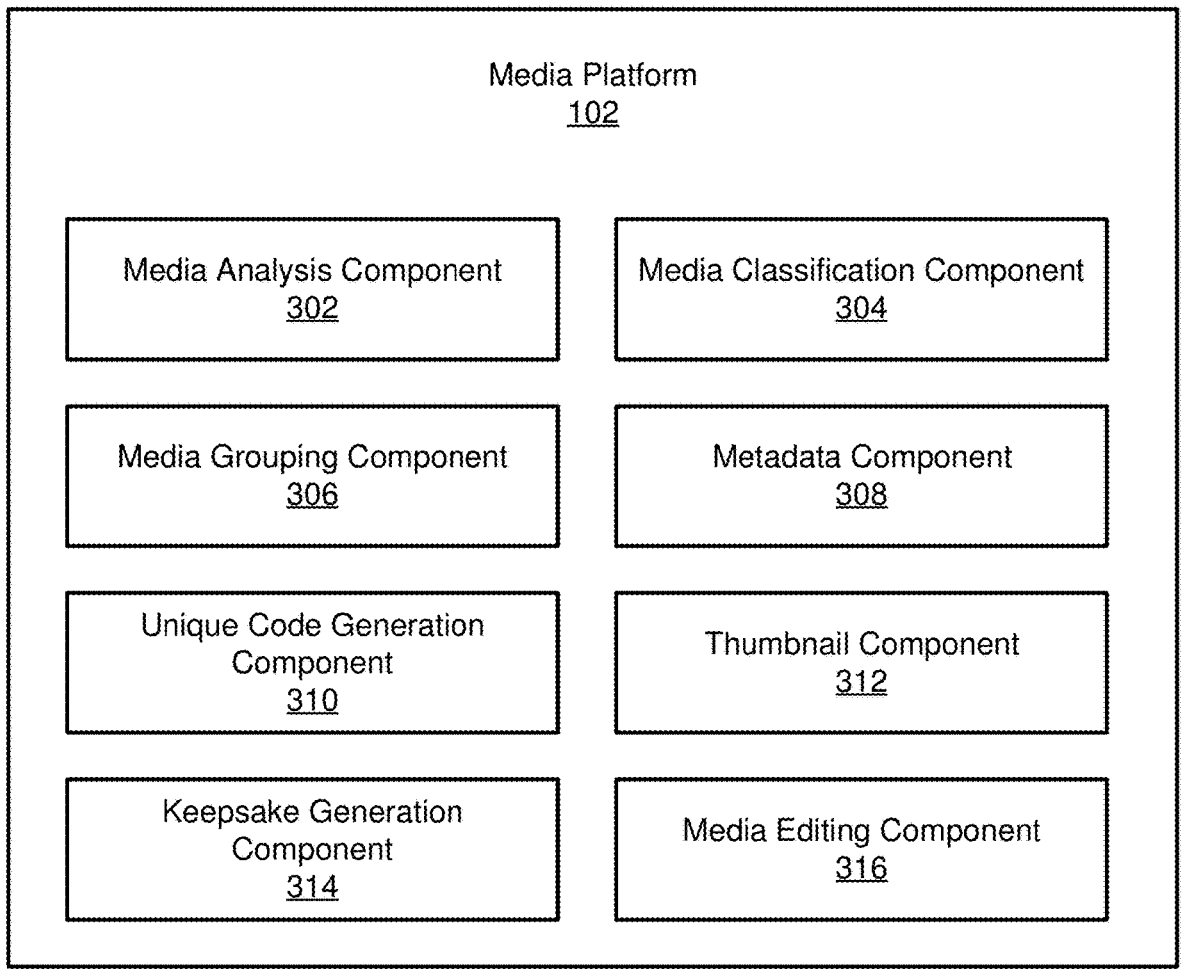
FIG. 3 is a block diagram of an example media platform.

FIG. 3 is a block diagram of the media platform 102. The media platform 102 includes one or more of the media analysis component 302, the media classification component 304, the media grouping component 306, the metadata component 308, the unique code generation component 310, the thumbnail component 312, the keepsake generation component 314, and the media editing component 316.

For purposes of illustration, programs and other executable program components are shown herein as discrete blocks, although it is understood that such programs and components may reside at various times in different storage components of a computing device and are executed by one or more processors. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "component" is intended to convey the implementation apparatus for accomplishing a process, such as by hardware, or a combination of hardware, software, and/or firmware, for the purposes of performing all or parts of operations disclosed herein. The terms "component" is intended to convey independence in how the modules, components, or their functionality or hardware may be implemented in different embodiments.

The media analysis component 302 is configured to analyze data objects uploaded by a user to be included in a data collection. The media analysis component 302 may include the neural network 114. The media analysis component 302 applies bounding boxes to images within the data collection to identify likely objects of interest within the images. The media analysis component 302 further assess the image data within the bounding boxes to classify the objects of interest as, for example, depicting a person, animal, background object, foreground object, or other known object. The media analysis component 302 additionally analyzes data objects within the data collection to assess the quality of the data objects. In the case of image frames and videos, the quality may be based at least in part on image processing metrics such as white balance, contrast, exposure, tint, and so forth. In the case of documents and written works, the quality may be based at least in part on whether the document is readable, whether the text conforms to grammar and spelling rules, and whether the text is applicable to other data objects within the data collection.

The media classification component 304 prioritizes data objects based at least in part on outputs from the neural network 114. The media classification component 304 may include a neural network 114 trained to classify the content of a document or image frame based on image analysis. The media classification component 304 may include a neural network trained to perform facial recognition to classify the identities of persons depicted in an image frame.

The media grouping component 306 selects one or more data objects to be associated with one another in a data collection. A user may upload a plurality of data objects, and the media grouping component 306 suggests one or more independent data collections that may each include one or more data objects. Each of the data collections may include related data objects based on geographical location, timestamp, content, camera metadata, and so forth. The media grouping component 306 may suggest that certain data objects be included together in a single data collection that is accessible with one unique code (see 406).

The metadata component 308 assigns metadata to the data objects stored on the media library 112. The metadata component 308 stitches together data objects within the same data collection by assigning the same data collection metadata identifier to each of the associated data objects.

The unique code generation component 310 generates a unique code (see 406) as described herein. The unique code may include a scannable thumbnail as described herein, wherein a code such as a QR code is merged with a thumbnail image to represent the data objects associated with the unique code. The unique code generation component 310 generates metadata associated with the unique code and assigns the same metadata to the data objects associated with the unique code.

The thumbnail component 312 identifies a thumbnail to represent one or more data objects within the data collection. The thumbnail may include an image frame or screen capture selected from the data objects within the data collection. The thumbnail may include a graphic, drawing, or text that represents the data objects within the data collection. The thumbnail component 312 may include a neural network for selecting an image or screen capture as described further herein.

The thumbnail component 312 is further configured to generate a scannable thumbnail as described herein by merging a unique code (such as a QR code) with a selected thumbnail. This process may include overlaying a two-dimensional code (such as a QR code) on top of the thumbnail. The media server 104 may enable a user to move the code to various locations on the thumbnail and alter the size of the code based on preference. The thumbnail component 312 further enables a user to export and download the scannable thumbnail such that the user can apply the scannable thumbnail to any documents or projects generated by the media server 104 or third parties.

The keepsake generation component 314 is a software package executed by the media server 104 that enables a user to generate a keepsake such as a photo book, art print, photo print, wall covering, photo carousel, and so forth. The keepsake generation component 314 may prompt a user to include one or more unique codes within a keepsake and associate additional data objects with the one or more unique codes.

The keepsake generation component 314 may compile a digital copy of all data objects that are printed on the keepsake and generates a unique code to be associated with the digital copies. In this implementation, a user may scan the unique code and have access to the digital copies such that the user can download, manipulate, or share the digital copies of the printed data objects. The keepsake generation component 314 may compile additional data objects that were not included in the keepsake and associate the additional data objects with a unique code. In this implementation, a user may scan the unique code associated with the additional data objects to view, download, and manipulate the additional data objects that were not included in the printed keepsake.

The media editing component 316 is a software package executed by the media server 104 that enables a user to manipulate data objects stored on the media library 112. The media editing component 316 enables a user to perform image processing edits on image frames. The media editing component 316 may restrict editing authorization to data objects such that only authorized users, such as the user who uploaded the data objects, are authorized to edit the data objects.

Figure 4:
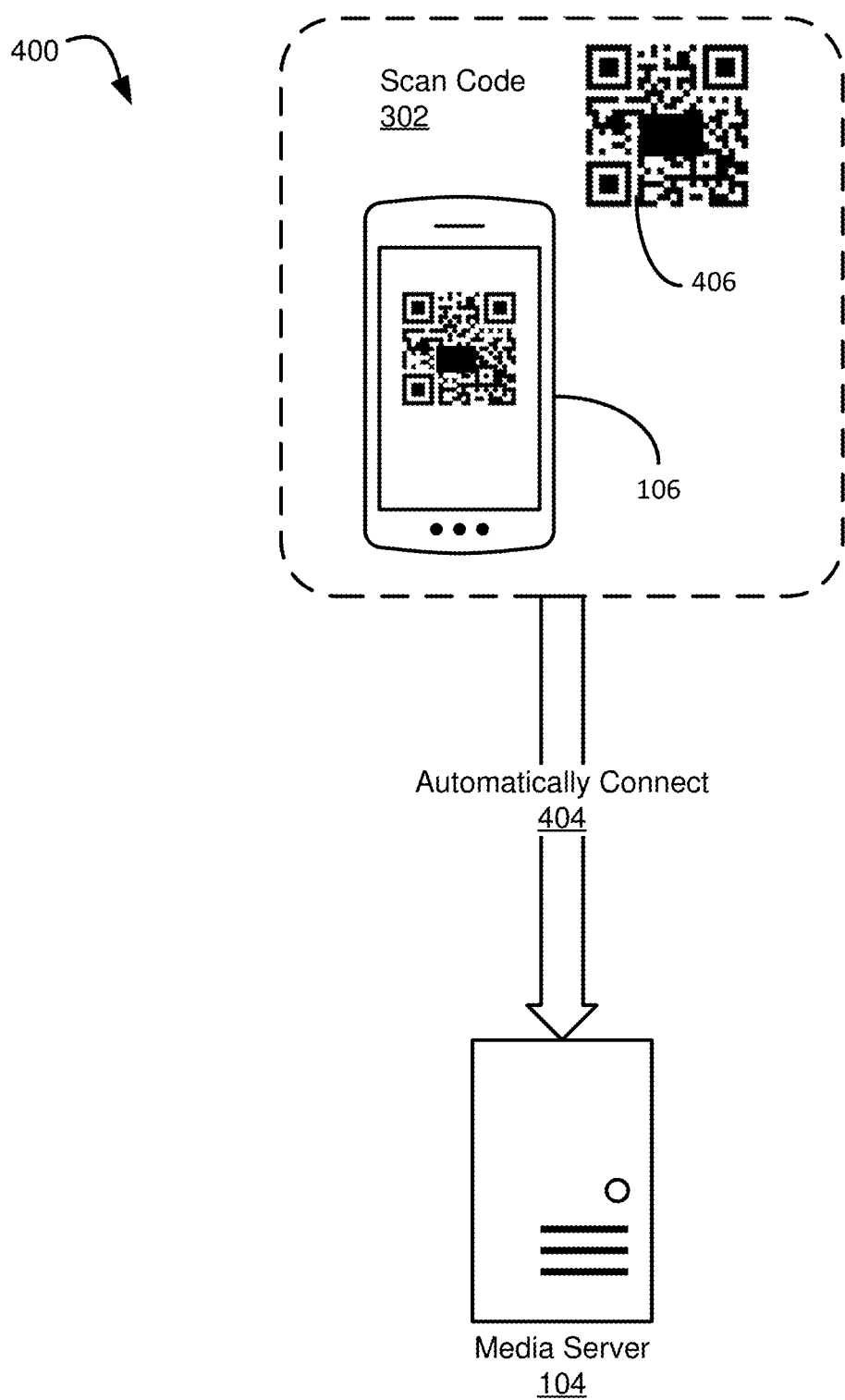
FIG. 4 is a schematic diagram of a system of connecting a personal device to a media server by way of a scannable code.

FIG. 4 is a schematic diagram of a system 400 for connecting a device to the media server 104. In an embodiment, a unique code 406 is provided and a personal device 106 can scan the code (see 402) to automatically connect (see 404) to the media server 104.

The unique code 406 may be any scannable figure or code that is readable by the personal device 106. Particularly as discussed herein, the unique code 406 includes a unique code that has been merged with a thumbnail to generate a scannable thumbnail. In an embodiment, the unique code 406 is a two-dimensional barcode such as a quick response (QR) code. The two-dimensional barcode can be digitally scanned by a camera or other sensor on the personal device 106. In an embodiment, the unique code 406 is designed to appear like a graphic or image and the two-dimensional barcode is integrated or "hidden" in the image. The unique code 406 may include multiple squares that can be read by the image sensor of the personal device 106.

In an embodiment where the unique code 406 is a QR code, the code includes three large squares (the three large squares can be seen in the upper-left, lower-left, and upperright corners of the example unique code 406 shown in FIG. 4) that serve as alignment targets while a smaller square in a remaining corner of the unique code 406 (the smaller square can be seen near the lower-right corner of the example unique code 406 shown in FIG. 4) serves to normalize the angle with which the image sensor hits the unique code 406. The remaining area of the unique code 406 is the actual data that is converted into binary code by the personal device 106. The unique code 406 may include many characters worth of data. In an example where the unique code 406 is a 117 pixel square, the code may hold 1852 characters of data.

In an embodiment, an image sensor of the personal device 106 is directed to scan the unique code 406, and the unique code 406 includes instructions for the personal device 106 to connect to the media server 104. A processor of the personal device 106 may execute the instructions stored in the unique code 406 to automatically connect 404 to the media server 104. In various implementations, the personal device 106 may request permission from a user and/or query the user whether the personal device 106 should connect to the media server 104. In an embodiment, automatically connecting 404 to the media server 104 brings the media platform 102 up on the personal device 106 in an application, program, webpage, or by some other suitable means.

Figure 5:
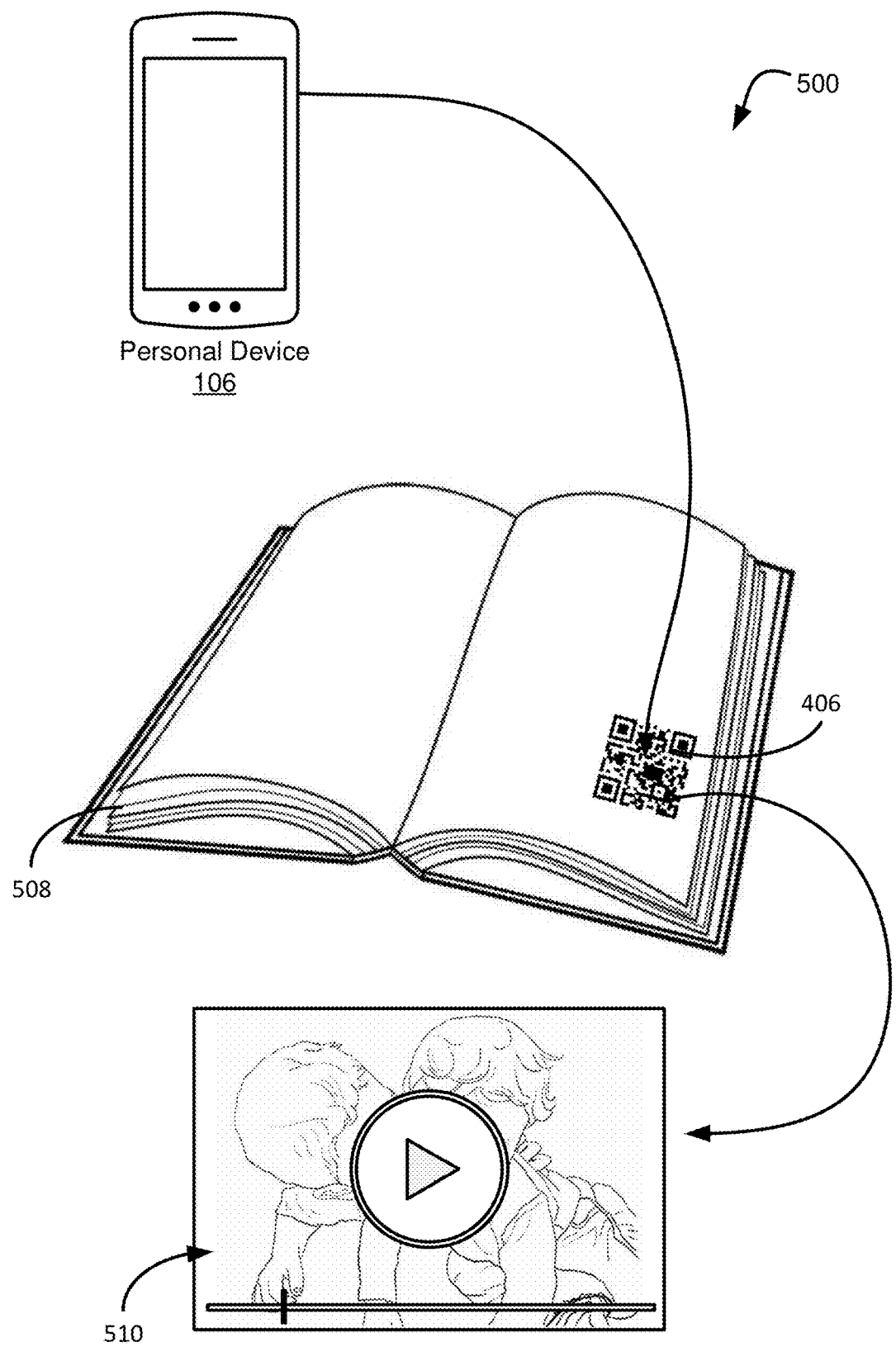
FIG. 5 is a schematic diagram of a system and process flow for connecting a personal device to additional digital media accessible by way of a user interface.

FIG. 5 is a schematic diagram of an example system 500 for implementing the systems and methods described herein. The system 500 includes a keepsake 508 with a unique code 406 printed thereon. The system 500 includes a user interface 510 accessible on the media platform, 102 and supported by the media server 104. The user interface 510 enables a user to view media associated with the unique code 406.

The keepsake 508 may include a printed article such as the book illustrated in FIG. 5. The keepsake may alternatively be stored in digital media and may be accessible on, for example, a website, computer-executed application, and so forth. In particular embodiments, the keepsake 508 is a printed article such as a book, art print, photograph print, photo carousel, magnet, and so forth. The keepsake 508 may specifically include a photo book that includes images printed thereon. The photo book may additionally unique codes 406 printed thereon in association with certain images.

In an example implementation, the keepsake 508 is a photo book that includes one or more printed images from a certain event such as a wedding, family event, vacation, life event, and so forth. The keepsake 508 may additionally include a unique code 406 printed in connection with those images to provide access to additional media from the same event. When the personal device 106 scans the unique code 406, the personal device is directed to a webpage or application to access the additional media from the same event. The additional media is stored on the media library 112 and accessed by the media server 104. The additional media may be hosted on a website and accessible over the network 110. The additional media may include, for example, videos, additional images, documents, written works, applicable historical information, and so forth. The keepsake 508 may have a plurality of unique codes 406 that direct the personal device 106 to access different data. In an example implementation, the keepsake 508 is a photo book and includes a spread of images from a particular family outing. This spread of images may additionally include a unique code 406 that directs to videos from the same family outing. The keepsake 508 may include additional images and media for various events, and each event could be associated with its own unique code 406 for accessing additional digital media.

The unique code 406 directs the personal device 106 to access a collection of data. The collection of data may be suggested by the neural network 114 and approved by a user, may be manually selected by a user, or may be selected by the media server 104 based on metadata. The collection of data may include data that was captured on the same date or time period, data that was captured at the same geographical location, data that includes similar background components as determined by the neural network 114, data that includes the same people as determined by facial recognition executed by the neural network 114, data that is manually selected by a user, "higher quality" data that is selected by the neural network 114, and so forth. The collection of data may include one or more videos, images, documents, written works, historical events, weather reports, hyperlinks, and so forth. The historical events may include, for example, news reports, videos, images, and written works pertaining to global of local events that occurred at a certain date or time period. The unique code 406 may be associated with a certain date or time period, and the media server 104 and/or neural network 114 may automatically retrieve data pertaining to that certain date or time period. The historical events may include an indication of the weather at a certain geographic location at a certain date or time period, a personal event that occurred at the certain date or time period, an event that occurred in the past on the same date or time period (in a different year) and so forth.

The user interface 510 may be accessed by way of a webpage, mobile application, or other computer-executed application. The user interface 510 enables a user to access all digital media associated with the unique code 406. One unique code 406 may provide access to multiple items, including videos, images, written works, metadata, historical data, and so forth. The user interface 510 may present an administrator "admin" login and a read-only site. The administrator login enables a user to edit the collection of data accessible by way of the unique code 406. The administrator may apply edits to the data itself, for example, may apply image processing adjustments to images or videos in the collection of data. The administrator may add new data or remove data from the collection of data. The user interface 510 additionally enables a user to "comment" or add additional feedback to the collection of data even without an administrator login.

Figure 6:
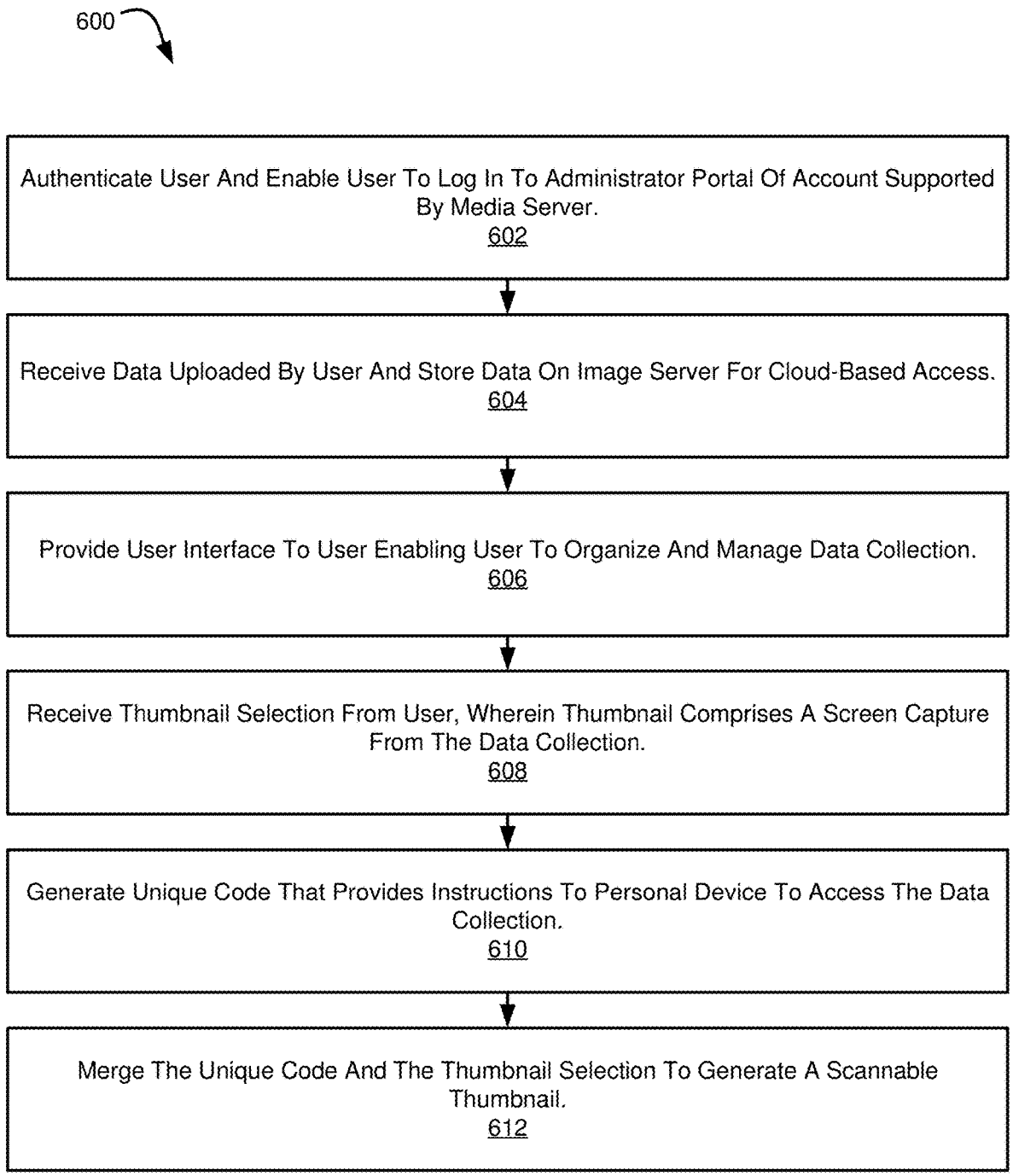
FIG. 6 is a schematic flow chart diagram of a method for generating a scannable thumbnail to be associated with a data collection.
Figure 7:
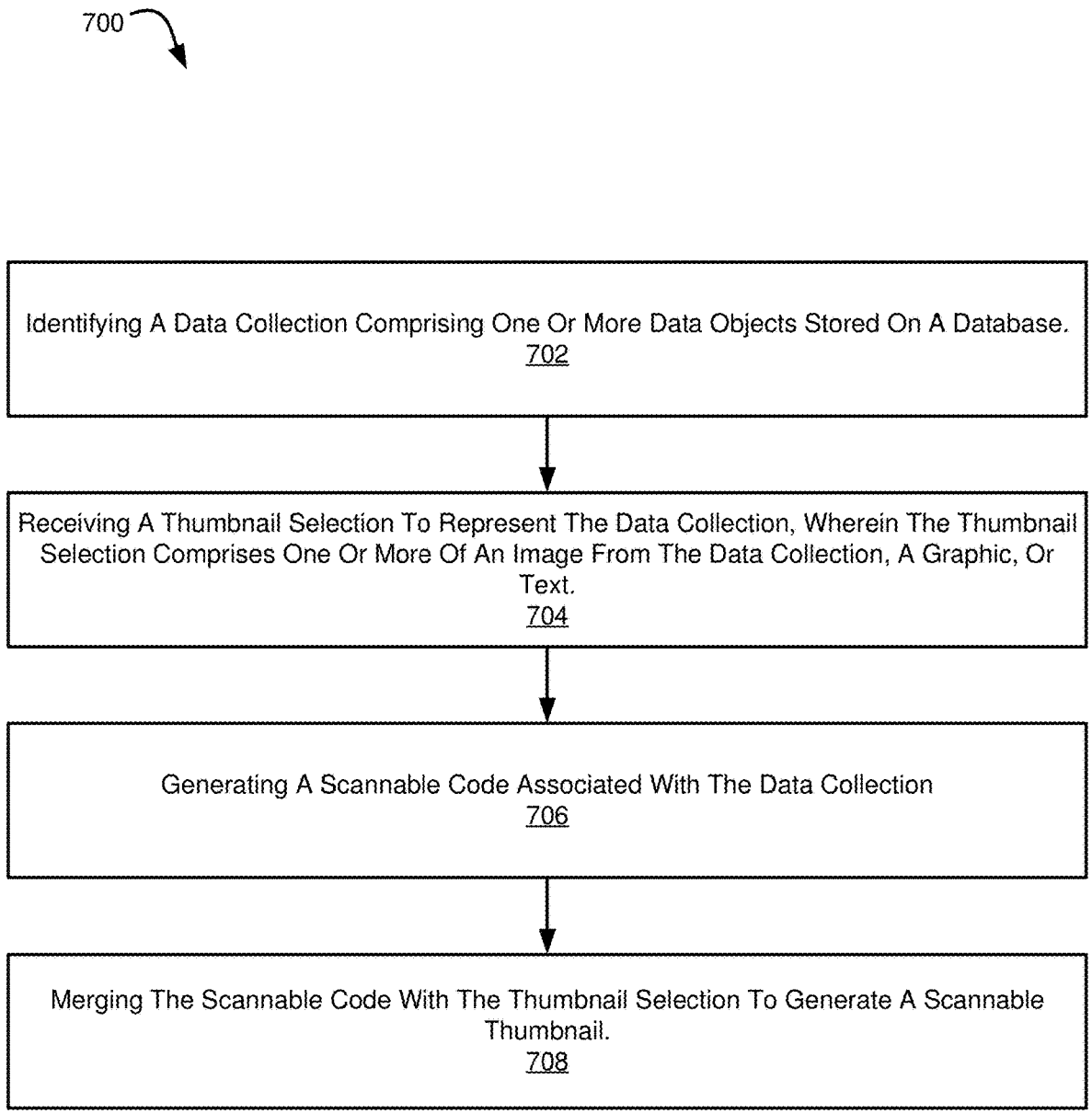
FIG. 7 is a schematic flow chart diagram of a method for generating a scannable thumbnail to be associated with a data collection.

FIG. 6 is a schematic flow chart diagram of a method 600 for generating a unique code for accessing a data collection. The method 600 includes authenticating at 602 a user and enabling the user to log in to an administrator portal of an account supported by the media server. The method 600 includes receiving data at 604 uploaded by the user and storing the data on the image server for cloud-based access. The method 600 includes providing at 606 a user interface to the user that enables the user to organize and manage the data collection. The method 600 includes receiving at 608 a thumbnail selection approval from the user, wherein the thumbnail comprises a screen capture from one or more data objects within the data collection. The method 600 includes generating at 610 a unique code that provides instructions to a personal device to access the data collection. The method 600 includes merging at 612 the unique code and the thumbnail selection to generate a scannable thumbnail.

The data uploaded by the user may include one or more independent data objects such as videos, images, written works, numerical data, historical data, and so forth. The one or more data objects may be grouped together to generate a data collection. The data collection may be grouped together by the neural network 114 as described herein and/or manually grouped together by the user. One data collection may include one or more data objects that are related based on geographical location, time, quality, subject matter, or some other metric. The data collection may include one or more data objects that are stitched together on the media library 112 using common metadata to indicate that each of the one or more data objects should be associated with the same data collection.

The user interface enables the user to create the data collection by adding or removing data objects in the data collection. The user interface enables the user to prioritize and rate data objects within the data collection and organize an ordering for how the data objects are presented when viewing the data collection. The user interface enables a user to perform image processing adjustments on images or videos within the data collection. The user interface enables a user to retrieve historical data by performing Internet browsing searches for historical data relating to a certain date, geographical location, or event.

The method 600 may further include generating one or more thumbnail suggestions by providing one or more data objects from the data collection to the neural network 114. The neural network 114 is trained to select desirable screen captures from the one or more data objects based on desirable subject matter, identifying common elements in the data collection, and desirable image processing metrics such as contrast, white balance, and exposure. The neural network 114 may be trained to prioritize human faces over other subject matter and to select a screen capture that comprises a human face. The neural network 114 may be trained to select a screen capture that comprises an object that is common in numerous image frames within the data collection. The media server 104 receives the recommended thumbnail screen captures from the neural network 114 and provides the recommended thumbnail screen captures to the user for approval and selection.

The unique code may include a QR code or other code as described herein. In an implementation, the process of merging the unique code and the thumbnail selection to generate the scannable thumbnail comprises altering the thumbnail selection image to include the unique code embedded within the image. In an implementation, the merging process includes overlaying the unique code on the thumbnail selection and enabling a user to select where the unique code is displayed on the thumbnail selection.

FIGS. 8A-8F illustrate screenshots of an example user interface 800. FIG. 8G is an example scannable thumbnail as described herein. The user interface 800 supports user interactions with the media platform 102 supported by the media server 104. The user interface 800 enables users to upload media to the media library 112, edit media stored on the media library 112, select a thumbnail, cause a unique code to be generated, select media to be associated with the unique code, generate a scannable thumbnail, and so forth as discussed herein.

Figure 8A:
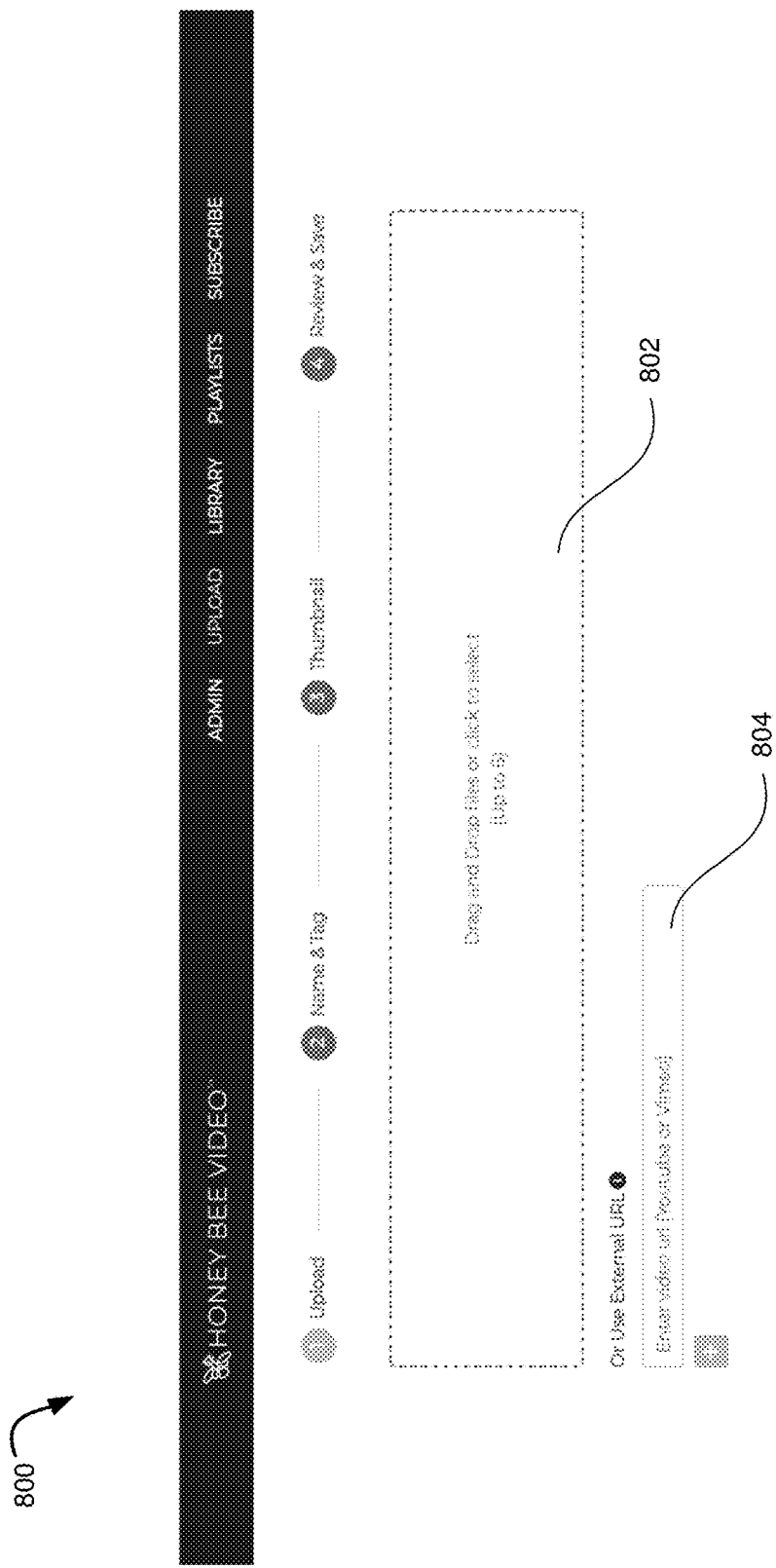
FIG. 8A is a screenshot of an example user interface providing a means to upload files to a server.

FIG. 8A is a screenshot of the user interface 800 illustrating a page for uploading files to the media platform 102. The files may include media to be stored on the media server 104 and/or media library 112. The user may upload files by connecting with an external URL (Uniform Resource Locator) at 804. The user may additionally upload files that are stored locally on the user's computer or remotely on a cloud-based storage solution. The user may upload any suitable file type, including, for example, text files, video files, image files, music files, and specialty file types that may be associated with a certain program or application. The user may drag and drop 802 files by pulling files from a folder or other file-storage location on the user's computer and dropping the files within the box on the user interface 800.

The user interface 800 includes an indication of where the user is within the process. For example, as illustrated in FIG. 8A, the user is currently in the "Upload" phase of the process, and the user will proceed to the "Name & Tag," "Thumbnail," and "Review & Save" phases of the process. The user interface 800 provides means for the user to navigate to different areas of the program. In the example user interface 800 illustrated in FIG. 8A, the user is currently on the UPLOAD page, and may navigate to other pages or sections, including ADMIN, LIBRARY, PLAYLISTS, and SUBSCRIBE.

Figure 8B:
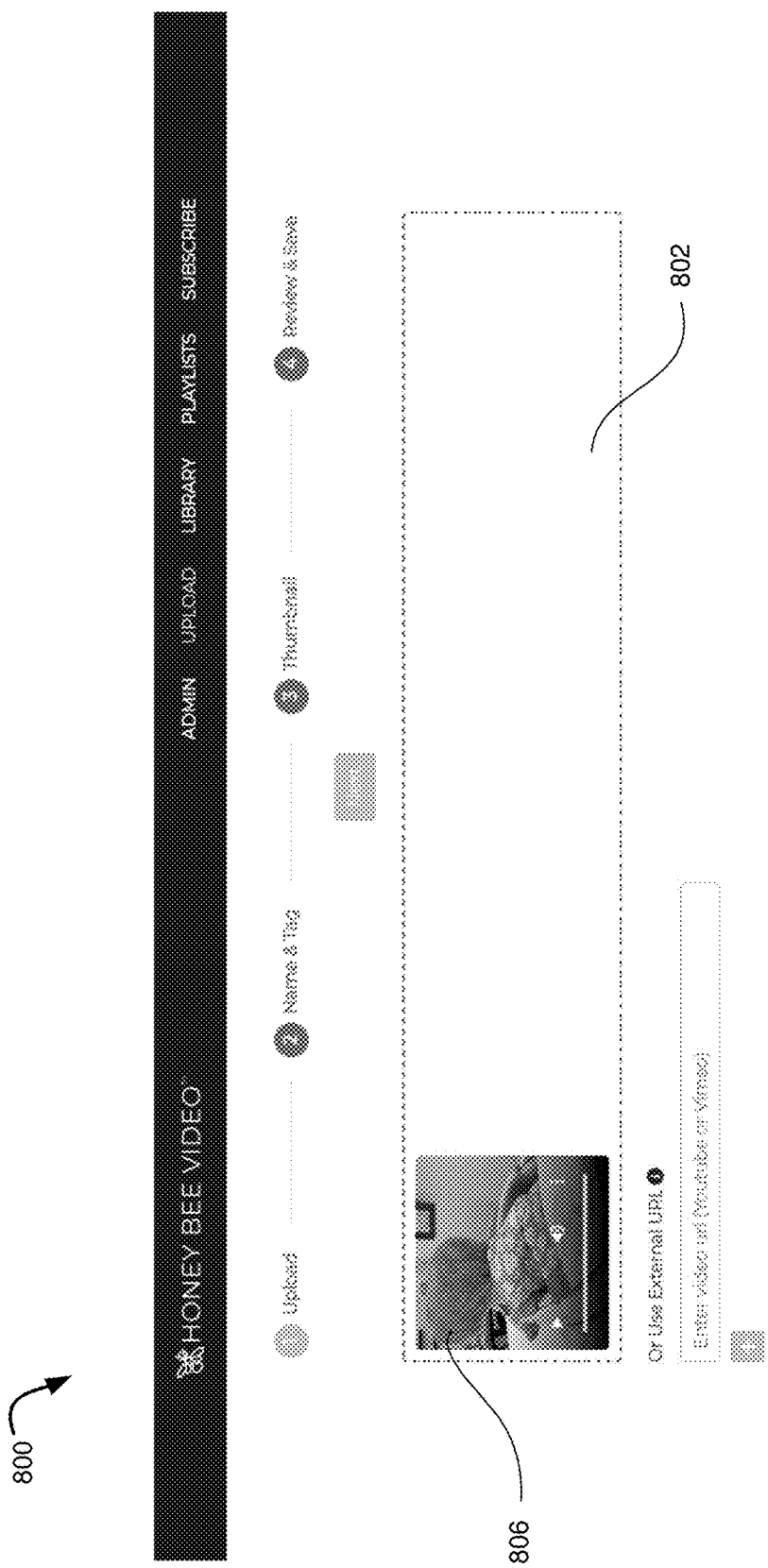
FIG. 8B is a screenshot of an example user interface providing a means to upload files to a server.

Turning now to FIG. 8B, the user has uploaded a video 806 using the drag and drop 802 box. The user may continue to navigate through the process by clicking "next." The user may play the video 806 to identify an image frame to use as a thumbnail to represent the video. The video 806 may be provided to a neural network trained to identify one or more optimal image frames that may be selected as the thumbnail.

Figure 8C:
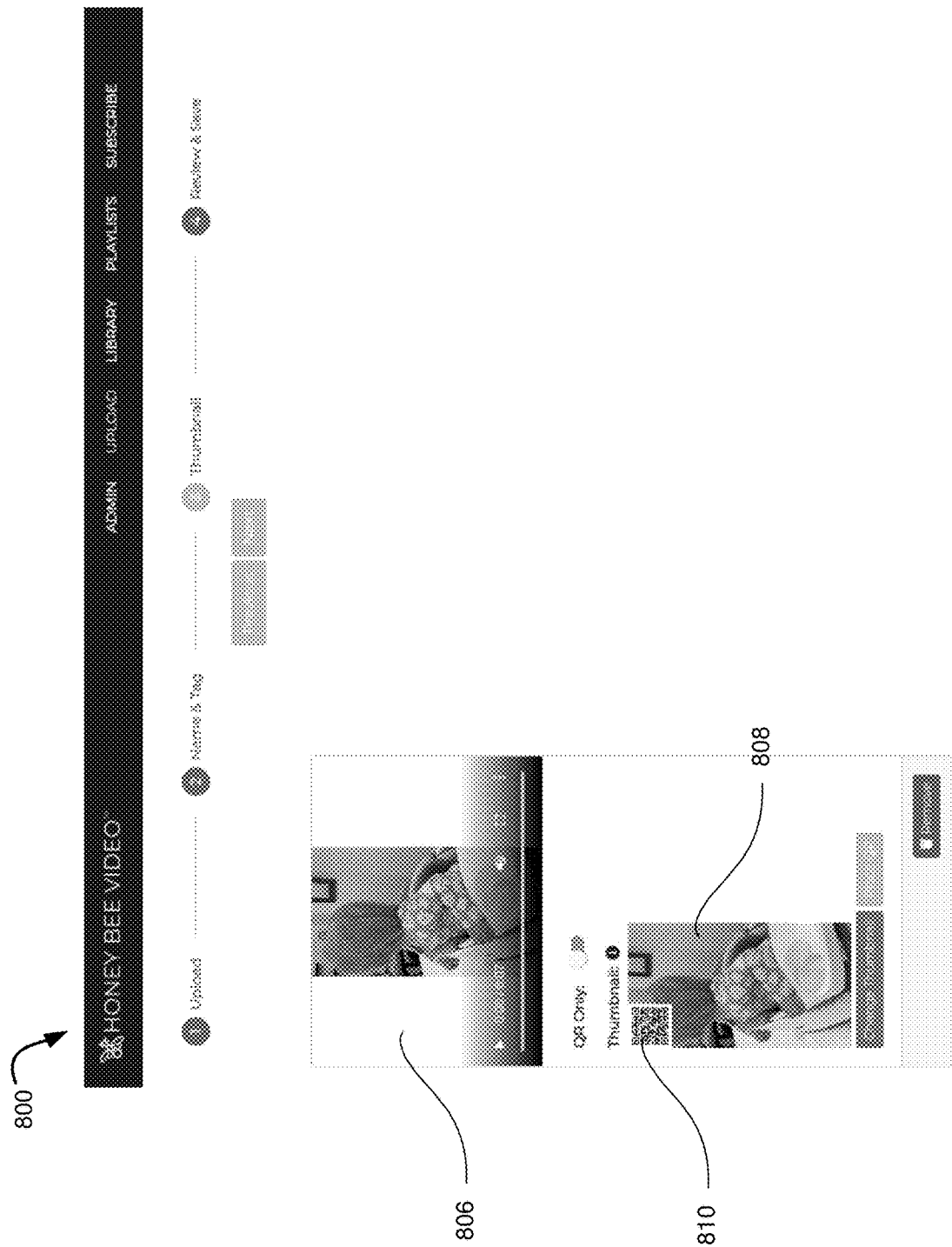
FIG. 8C is a screenshot of an example user interface providing a means to select a thumbnail to represent uploaded media and to associate a unique code with the thumbnail.

Turning now to FIG. 8C, the video 806 has been uploaded and a thumbnail 808 has been selected. FIG. 8C illustrates an implementation wherein the thumbnail 808 is an image frame or screen capture selected from the video 806. However, as discussed herein, the thumbnail 808 may be any image, graphic, alphanumeric grouping, document, and so forth that may represent the video 806. The media server 104 generates a unique code 810 and attaches the unique code 810 to the thumbnail 808. A user may navigate the user interface to place the unique code 810 (QR) on the thumbnail 808, change the thumbnail 808, or remove the thumbnail 808. The user may indicate that a different type of unique code should be used, rather than the default QR code.

Figure 8D:
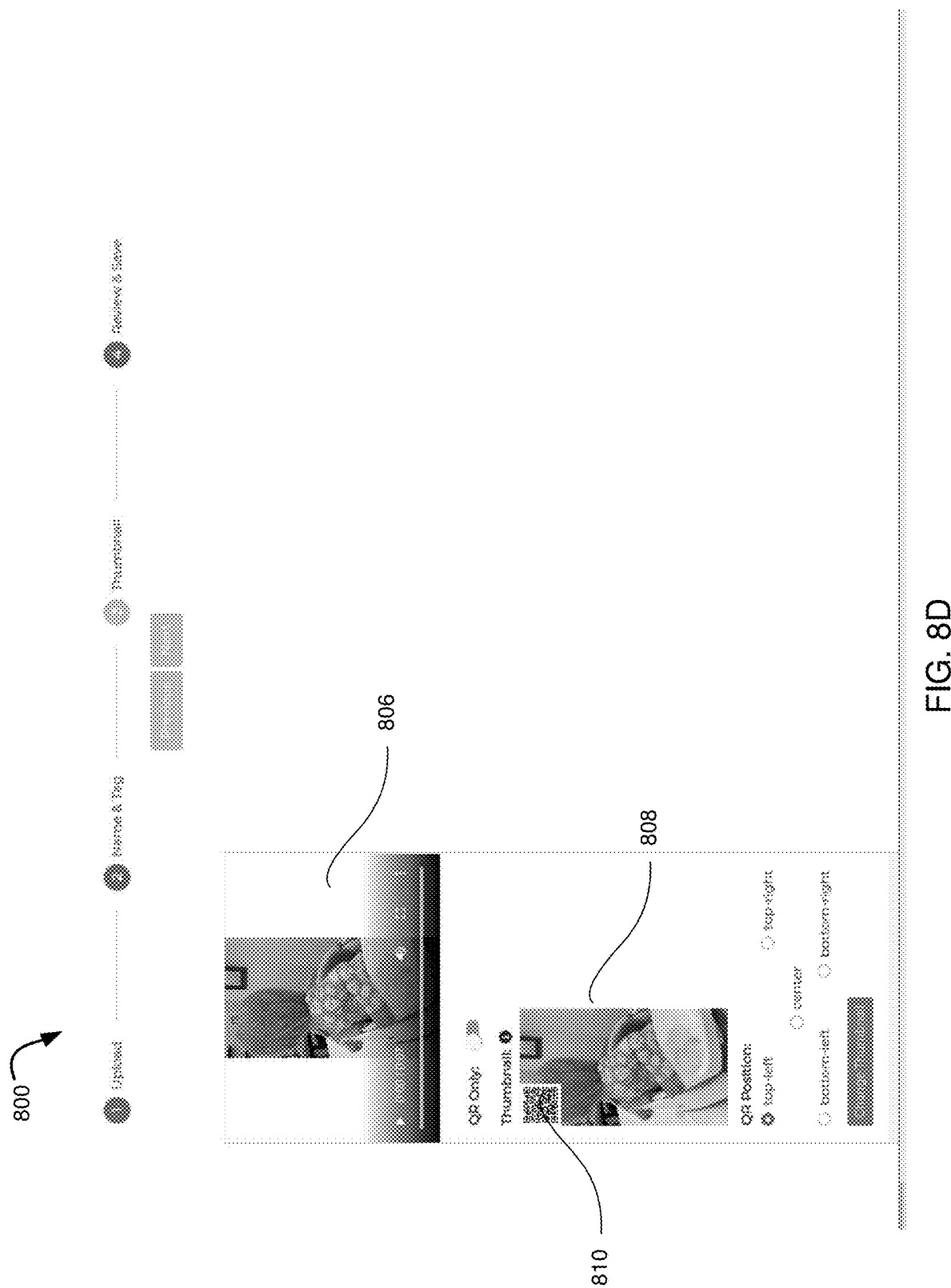
FIG. 8D is a screenshot of an example user interface providing a means to select a thumbnail to represent uploaded media and to associate a unique code with the thumbnail.

FIG. 8D illustrates wherein the position of the unique code 810 on the thumbnail 808 may be adjusted by a user. In the example illustrated in FIG. 8D, a user may indicate that the unique code 810 should be displayed on the thumbnail 808 at the top left, top right, center, bottom left, or bottom right of the thumbnail 808. Additionally, the unique code 810 may be manually dragged across the thumbnail 808 to be placed in a unique position.

Figure 8E:
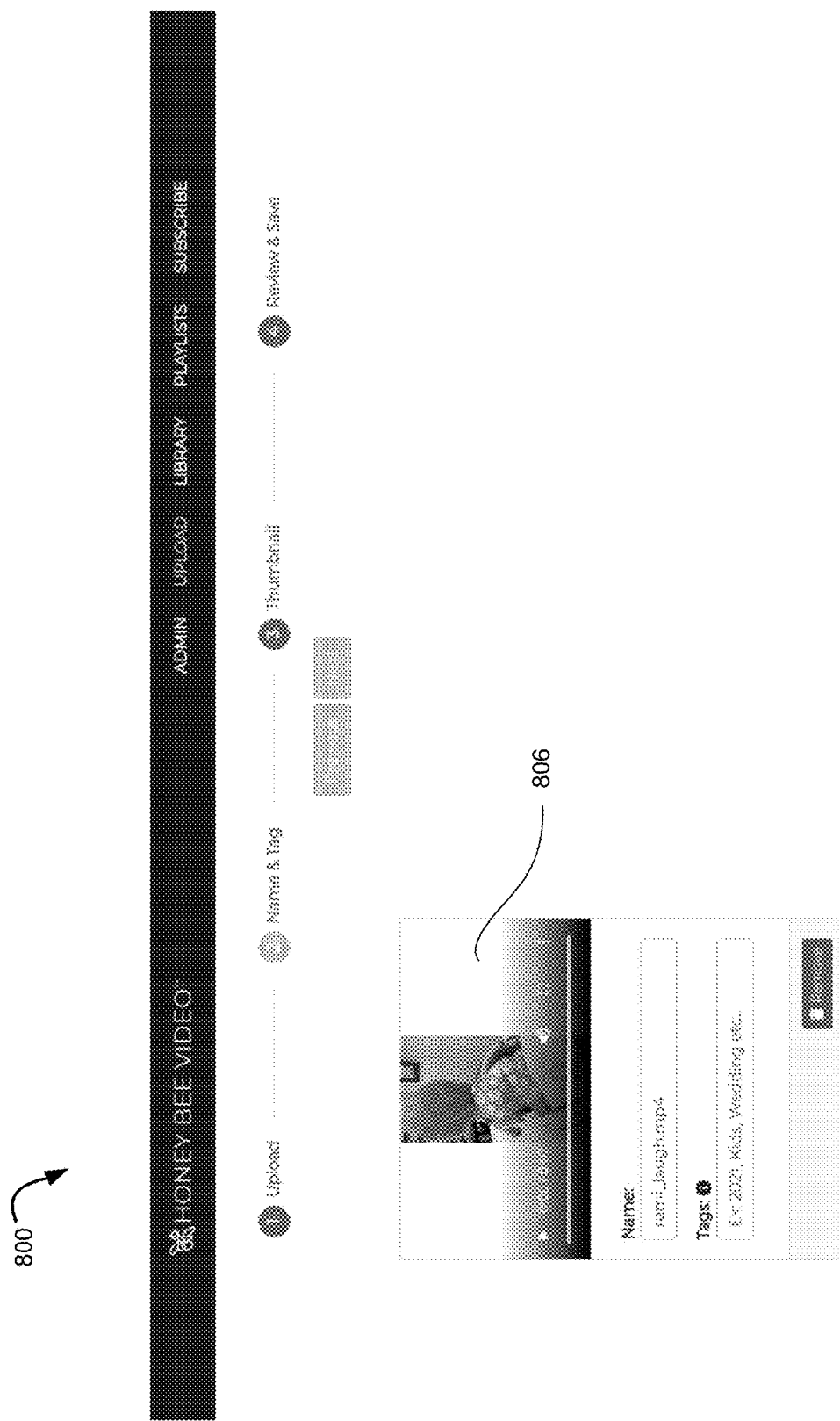
FIG. 8E is a screenshot of an example user interface providing a means to associate metadata with a file.

FIG. 8E illustrates wherein the video 806 can be named, tagged, and organized. A user may provide a unique name for the video 806 to enable easy location of the video 806 within the media library 112. The user may submit tags to be associated with the video 806, and these tags represent metadata for the video 806. The tags may, for example, who is depicted in the video, the subject of the video, the time or season the video was captured, and so forth. The tags will be stored in association with the video 806 on the media library 112.

Figure 8F:
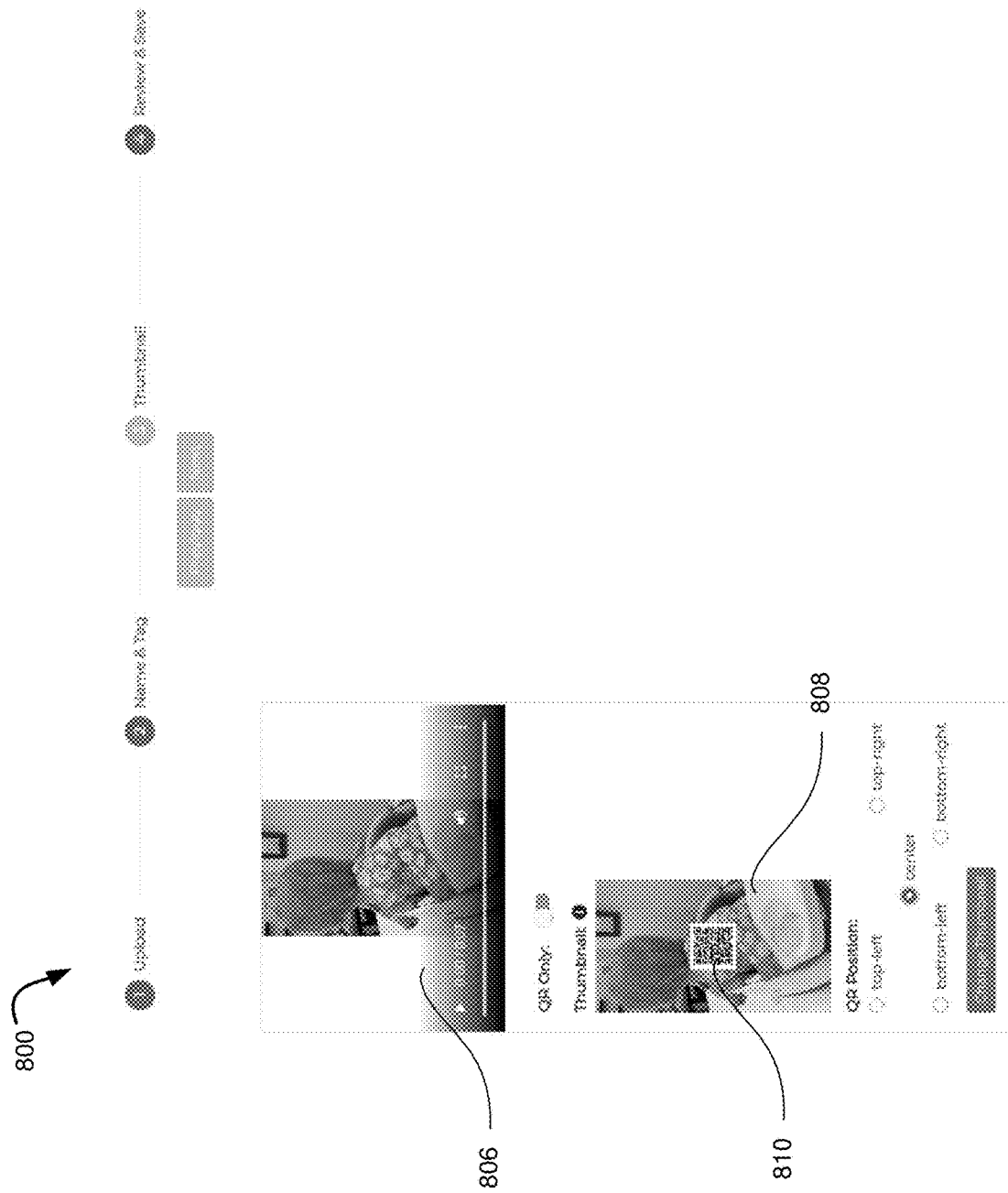
FIG. 8F is a screenshot of an example user interface providing a means to select a thumbnail to represent uploaded media and to associate a unique code with the thumbnail.
Figure 8G:
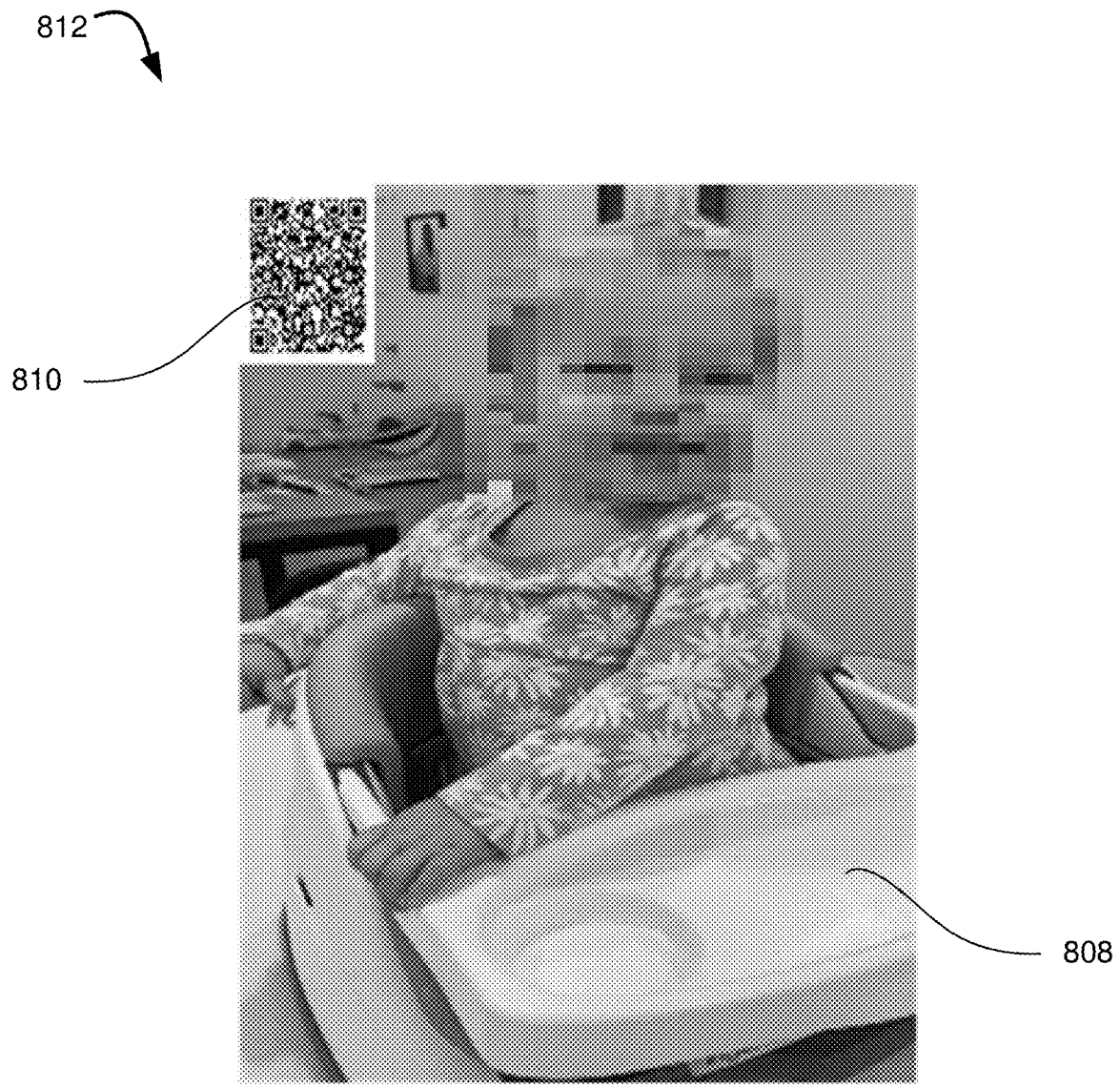
FIG. 8G is an example scannable thumbnail comprising a unique code and a thumbnail.

FIG. 8F illustrates wherein the unique code 810 is displayed in the center of the thumbnail 808. The combination of the unique code 810 and the thumbnail 808 produces a scannable thumbnail. The scannable thumbnail may be captured or scanned with a sensor and provide instructions to redirect to a website, file system, database, and so forth. The unique code 810 may provide instructions to access a website where the video 806 may be viewed.

FIG. 8G illustrates an example scannable thumbnail 812. The scannable thumbnail 812 includes a thumbnail 808 and a unique code 810. It should be appreciated that the thumbnail 808 and scannable thumbnail 812 may include any suitable file size and do not necessarily have a condensed or compressed file size typically associated with a "thumbnail image." The thumbnail 808 may include an image frame from a video 806, a screen capture, an image, a document, a graphic, and so forth. The unique code 810 may redirect a computing device to access additional media associated with the thumbnail 808.

Figure 9:
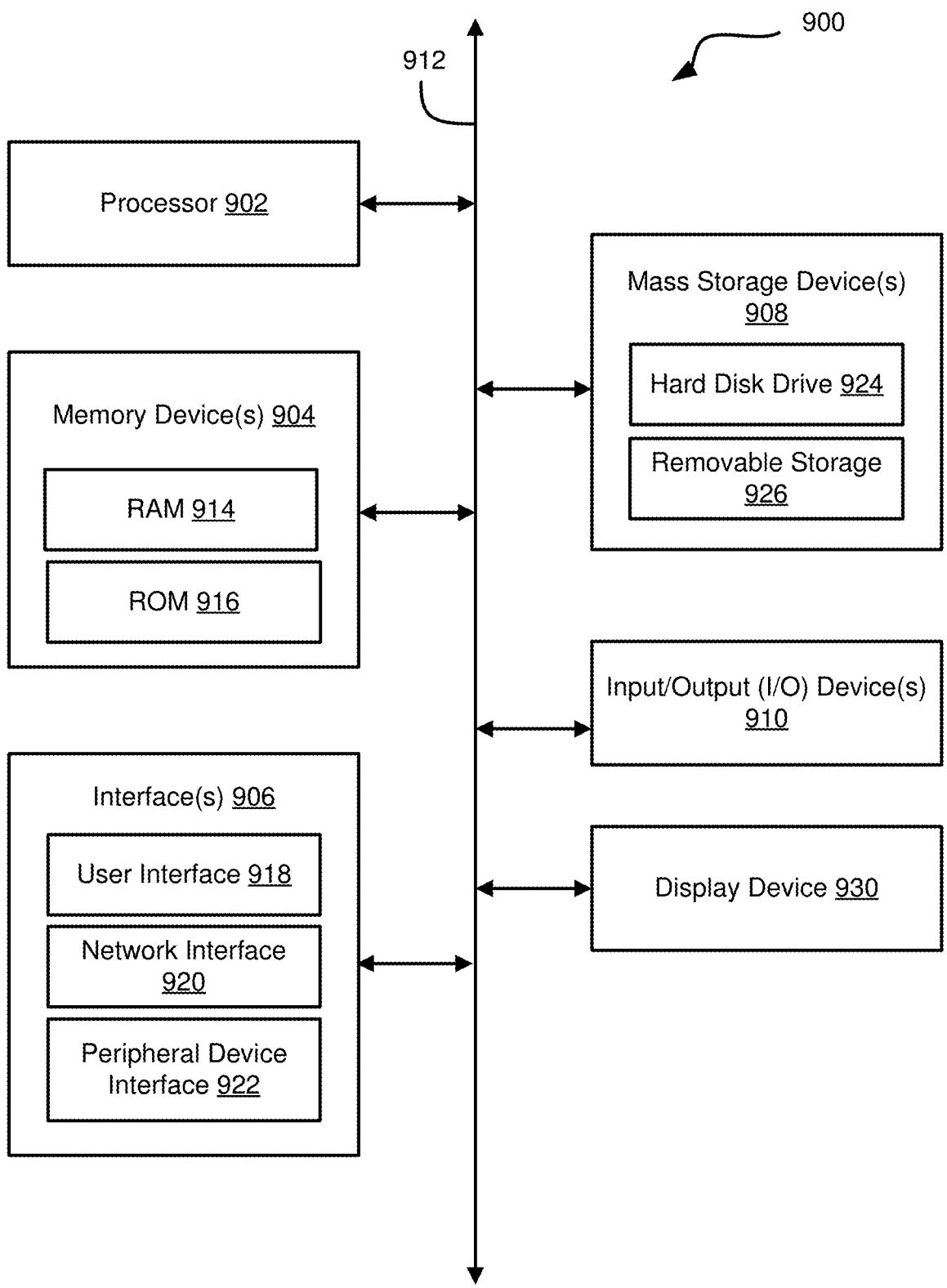
FIG. 9 is a schematic block diagram of an example computing system according to an example embodiment of the systems and methods described herein.

Referring now to FIG. 9, a block diagram of an example computing device 900 is illustrated. Computing device 900 may be used to perform various procedures, such as those discussed herein. Computing device 900 can perform various monitoring functions as discussed herein, and can execute one or more application programs, such as the application programs or functionality described herein. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device 908 is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, barcode scanners, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces 922 such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900 and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to emphasize their implementation independence more particularly. For example, a component or module may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

EXAMPLES

The following examples pertain to further embodiments.

Example 1 is a method. The method includes identifying a data collection comprising one or more data objects stored on a database. The method includes receiving a thumbnail selection to represent the data collection, wherein the thumbnail selection comprises one or more of an image from the data collection, a graphic, or a text. The method includes generating a scannable code associated with the data collection. The method includes merging the scannable code with the thumbnail selection to generate a scannable thumbnail.

Example 2 is a method as in Example 1, wherein merging the scannable code with the thumbnail selection comprises: overlaying the scannable code on the thumbnail selection; and enabling a user to alter a location and size of the scannable code relative to the thumbnail selection.

Example 3 is a method as in any of Examples 1-2, further comprising: providing the data collection on a webpage such that the data collection can be accessed over a global network; and associating the scannable code with the webpage; wherein scanning the scannable code with an image sensor of a computing device provides instructions to the computing device to direct to the webpage to access the data collection.

Example 4 is a method as in any of Examples 1-3, wherein the one or more objects in the data collection comprise one or more of: videos, images, documents, text, artwork, or historical data.

Example 5 is a method as in any of Examples 1-4, wherein identifying the data collection comprises: receiving a plurality of data objects from a user, wherein the plurality of data objects are uploaded by the user to the database; providing the plurality of data objects to a neural network trained to classify one or more objects of interest within the plurality of data objects based on image analysis; providing the plurality of data objects to a neural network trained to identify one or more persons depicted in the plurality of data objects based on facial recognition; and suggesting the one or more data objects to be included in the data collection based on commonality of one or more of: objects of interest, persons depicted, geographical location, time period, or camera metadata.

Example 6 is a method as in any of Examples 1-5, further comprising generating one or more thumbnail suggestions, wherein the generating the one or more thumbnail suggestions comprises: providing the one or more objects of the data collection to a neural network trained to identify a desirable image frame based on one or more: presence of a human face, image contrast, image exposure, or image white balance; receiving one or more desirable image frames from the neural network; downsizing at least one of the one or more desirable image frames to generate a suggested thumbnail; and providing the suggested thumbnail to a user for approval.

Example 7 is a method as in any of Examples 1-6, further comprising: generating a digital rendering of a keepsake to be printed, wherein the keepsake comprises one or more of a photo book, an art print, a wall covering, or an image print; and attaching the scannable thumbnail to the digital rendering of the keepsake; wherein the scannable thumbnail is printed on the keepsake such that a computing device can scan the scannable thumbnail and be directed to access the data collection.

Example 8 is a method as in any of Examples 1-7, further comprising stitching together the one or more data objects of the data collection on the database by assigning a unique data collection identifier to the data collection and storing the unique data collection identifier as metadata for each of the one or more data objects.

Example 9 is a method as in any of Examples 1-8, further comprising generating a data collection playlist comprising the one or more data objects presented in a sequence as a video and publishing the data collection playlist on a webpage, wherein scanning the scannable thumbnail with a computing device provides instructions to the computing device to direct to the webpage to access the data collection playlist.

Example 10 is a method as in any of Examples 1-9, wherein the scannable code is a machine-readable optical label.

Example 11 is a system including one or more processors for executing instructions, wherein the instructions include any of the method steps recited in Examples 1-10.

Example 12 is non-transitory computer readable storage media storing instructions for execution by one or more processors, wherein the instructions include any of the method steps recited in Examples 1-10.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method of associating digital media with a tangible keepsake, the method comprising:
    receiving, from a user, a video file to be stored on a database in communication with a network, wherein the video file comprises image data and audio data;
    storing the video file on the database;
    executing a facial recognition algorithm on the video file to identify one or more of a person or a location depicted in the video file;
    suggesting a data collection stored on the database to associate with the video file based on the one or more of the person or the location depicted in the video file, wherein the data collection is associated with the user, and wherein the data collection comprises one or more data objects also comprising the person, or the location depicted in the video file;
    suggesting to the user to generate the tangible keepsake, wherein the tangible keepsake comprises a printed data object from the data collection and further comprises a scannable code for accessing the video file associated with the data collection;
    publishing the video file to a webpage accessible by way of a network, wherein the webpage is associated with a uniform resource locator (URL);
    identifying a thumbnail selection to represent the video file within the data collection, wherein the thumbnail selection comprises one or more of an image frame extracted from the video file or at least one of the one or more data objects associated with the data collection;
    generating the scannable code for accessing the video, wherein the scannable code is associated with the webpage where the video file is published, and wherein the scannable code comprises instructions for redirecting a computing device to the URL associated with the webpage to enable the computing device to download or stream the video file; and
    merging the scannable code with the thumbnail selection to generate a scannable thumbnail associated with the video file, wherein the scannable thumbnail is rendered to be printed on the tangible keepsake;
    wherein the scannable thumbnail associates the tangible keepsake with the video file in response to printing the scannable thumbnail on the tangible keepsake.

2. The method of claim 1, wherein merging the scannable code with the thumbnail selection comprises:
    overlaying the scannable code on the thumbnail selection; and
    enabling the user to alter a location and size of the scannable code relative to the thumbnail selection.

3. The method of claim 1, wherein the data collection stored on the database comprises one or more of videos, images, documents, text, artwork, or historical data.

4. The method of claim 1, further comprising generating one or more thumbnail suggestions, wherein the generating the one or more thumbnail suggestions comprises:
    providing the one or more objects of the data collection to a neural network trained to identify a desirable image frame based on one or more: presence of a human face, image contrast, image exposure, or image white balance;
    receiving one or more desirable image frames from the neural network;
    downsizing at least one of the one or more desirable image frames to generate a suggested thumbnail; and
    providing the suggested thumbnail to a user for approval.

5. The method of claim 1, further comprising:
    generating a digital rendering of the tangible keepsake to be printed, wherein the tangible keepsake comprises one or more of a photo book, an art print, a wall covering, or an image print; and
    attaching the scannable thumbnail to the digital rendering of the tangible keepsake;
    wherein the scannable thumbnail is printed on the tangible keepsake such that a computing device can scan the scannable thumbnail and be directed to access the URL comprising the video file.

6. The method of claim 1, further comprising stitching together a plurality of data objects associated with the data collection on the database by assigning a unique data collection identifier to the data collection and storing the unique data collection identifier as metadata for each of the plurality of data objects.

7. The method of claim 1, wherein the data collection comprises a plurality of data objects including the video file, and wherein the method further comprises:
    generating a data collection playlist comprising the plurality of more data objects presented in a sequence as a video; and
    publishing the data collection playlist on the webpage.

8. The method of claim 1, wherein the scannable code is a machine-readable optical label.

9. The method of claim 1, further comprising:
    receiving a plurality of data objects from the user, wherein the plurality of data objects comprises one or more of video files, image files, text documents, or audio files;
    providing at least a portion of the plurality of data objects to a neural network trained to classify objects of interest within the plurality of data objects;
    receiving an output from the neural network comprising a classification of one or more objects of interest within each of the portion of the plurality of data objects; and
    suggesting to the user an applicable data collection for one or more of the plurality of data objects based on the output from the neural network.

10. The method of claim 1, further comprising rendering a user interface for preparing a digital rendering of the tangible keepsake, wherein rendering the user interface comprises:
    enabling the user to implement one or more edits to the one or more data objects associated with the data collection, wherein the one or more edits comprises one or more of adjusting white balance, contrast, exposure, cropping, or tint;
    enabling the user to select which of the one or more data objects within the data collection should be printed on the tangible keepsake; and enabling the user to select which of the one or more data objects should be accessible by way of the webpage.

11. The method of claim 1, further comprising extracting metadata from the video file, wherein the metadata comprises one or more of a geographical location where the video file was captured or a capture timestamp;
wherein suggesting the data collection stored on the database to associate with the video file comprises identifying the data collection based on the metadata.

12. The method of claim 11, wherein the data collection comprises one or more data objects also comprising one or more of:
the same geographical location where the video file was captured within a threshold distance; or
the same capture timestamp as the video within a threshold timeframe.

13. A system for associating digital media with a tangible keepsake, wherein the system comprises one or more processors for executing instructions stored on non-transitory computer readable storage media, the instructions comprising:
receiving, from a user, a video file to be stored on a database in communication with a network, wherein the video file comprises image data and audio data;
storing the video file on the database;
executing a facial recognition algorithm on the video file to identify one or more of a person or a location depicted in the video file;
suggesting a data collection stored on the database to associate with the video file based on the one or more of the person or the location depicted in the video file, wherein the data collection is associated with the user, and wherein the data collection comprises one or more data objects also comprising the person, or the location depicted in the video file;
suggesting to the user to generate the tangible keepsake, wherein the tangible keepsake comprises a printed data object from the data collection and further comprises a scannable code for accessing the video file associated with the data collection;
publishing the video file to a webpage accessible by way of a network, wherein the webpage is associated with a uniform resource locator (URL);
identifying a thumbnail selection to represent the video file within the data collection, wherein the thumbnail selection comprises one or more of an image frame extracted from the video file or at least one of the one or more data objects associated with the data collection;
generating the scannable code for accessing the video, wherein the scannable code is associated with the webpage where the video file is published, and wherein the scannable code comprises instructions for redirecting a computing device to the URL associated with the webpage to enable the computing device to download or stream the video file; and
merging the scannable code with the thumbnail selection to generate a scannable thumbnail associated with the video file, wherein the scannable thumbnail is rendered to be printed on the tangible keepsake;
wherein the scannable thumbnail associates the tangible keepsake with the video file in response to printing the scannable thumbnail on the tangible keepsake.

14. The system of claim 13, wherein the instructions are such that merging the scannable code with the thumbnail selection comprises:
overlaying the scannable code on the thumbnail selection; and
enabling the user to alter a location and size of the scannable code relative to the thumbnail selection.

15. The system of claim 13, wherein the instructions further comprise generating one or more thumbnail suggestions, wherein the generating the one or more thumbnail suggestions comprises:
providing the one or more objects of the data collection to a neural network trained to identify a desirable image frame based on one or more: presence of a human face, image contrast, image exposure, or image white balance;
receiving one or more desirable image frames from the neural network;
downsizing at least one of the one or more desirable image frames to generate a suggested thumbnail; and
providing the suggested thumbnail to a user for approval.

16. Non-transitory computer readable storage media for storing instructions for associating digital media with a tangible keepsake, wherein the instructions are executed by one or more processors and comprise:
receiving, from a user, a video file to be stored on a database in communication with a network, wherein the video file comprises image data and audio data;
storing the video file on the database;
executing a facial recognition algorithm on the video file to identify one or more of a person or a location depicted in the video file;
suggesting a data collection stored on the database to associate with the video file based on the one or more of the person or the location depicted in the video file, wherein the data collection is associated with the user, and wherein the data collection comprises one or more data objects also comprising the person, or the location depicted in the video file;
suggesting to the user to generate the tangible keepsake, wherein the tangible keepsake comprises a printed data object from the data collection and further comprises a scannable code for accessing the video file associated with the data collection;
publishing the video file to a webpage accessible by way of a network, wherein the webpage is associated with a uniform resource locator (URL);
identifying a thumbnail selection to represent the video file within the data collection, wherein the thumbnail selection comprises one or more of an image frame extracted from the video file or at least one of the one or more data objects associated with the data collection;
generating the scannable code for accessing the video, wherein the scannable code is associated with the webpage where the video file is published, and wherein the scannable code comprises instructions for redirecting a computing device to the URL associated with the webpage to enable the computing device to download or stream the video file; and
merging the scannable code with the thumbnail selection to generate a scannable thumbnail associated with the video file, wherein the scannable thumbnail is rendered to be printed on the tangible keepsake;
wherein the scannable thumbnail associates the tangible keepsake with the video file in response to printing the scannable thumbnail on the tangible keepsake.

17. The non-transitory computer readable storage media of claim 16, wherein the instructions further comprise:
generating a digital rendering of the tangible keepsake to be printed, wherein the tangible keepsake comprises one or more of a photo book, an art print, a wall covering, or an image print; and attaching the scannable thumbnail to the digital rendering of the tangible keepsake;

wherein the scannable thumbnail is printed on the tangible keepsake such that a computing device can scan the scannable thumbnail and be directed to access the URL comprising the video file.

18. The non-transitory computer readable storage media of claim 16, wherein the instructions further comprise stitching together a plurality of data objects associated with the data collection on the database by assigning a unique data collection identifier to the data collection and storing the unique data collection identifier as metadata for each of the plurality of data objects.

19. The non-transitory computer readable storage media of claim 16, wherein the data collection comprises a plurality of data objects including the video file, and wherein the instructions further comprise:

generating a data collection playlist comprising the plurality of data objects presented in a sequence as a video; and publishing the data collection playlist on the webpage.

20. The non-transitory computer readable storage media of claim 16, wherein the instructions are such that merging the scannable code with the thumbnail selection comprises:

overlaying the scannable code on the thumbnail selection; and enabling the user to alter a location and size of the scannable code relative to the thumbnail selection.

* * * * *